(12) United States Patent
Wagoner et al.

(10) Patent No.: US 10,700,526 B2
(45) Date of Patent: Jun. 30, 2020

(54) SOLAR POWER CONVERTER WITH FOUR-WIRE GRID-SIDE CONNECTION

(71) Applicant: GE Energy Power Conversion Technology Ltd., Warwickshire (GB)

(72) Inventors: Robert Gregory Wagoner, Salem, VA (US); Allen Michael Ritter, Salem, VA (US); Anthony William Galbraith, Salem, VA (US)

(73) Assignee: GE Energy Power Conversion Technology LTD., Warwickshire (GB)

( * ) Notice: Subject to any disclaimer, the term of this patent is extended or adjusted under 35 U.S.C. 154(b) by 0 days.

(21) Appl. No.: 15/068,909

(22) Filed: Mar. 14, 2016

(65) Prior Publication Data

US 2017/0264098 A1 Sep. 14, 2017

(51) Int. Cl.
*H02J 3/38* (2006.01)
*H02M 7/537* (2006.01)
*H02M 1/12* (2006.01)

(52) U.S. Cl.
CPC .............. *H02J 3/383* (2013.01); *H02M 7/537* (2013.01); *H02M 1/126* (2013.01); *H02M 2001/123* (2013.01); *Y02E 10/563* (2013.01)

(58) Field of Classification Search
CPC ...... H02J 1/10; H02J 1/102; H02J 7/35; H02J 3/383; Y02E 60/12; G06F 1/26; H02M 7/537
USPC .......................................................... 307/43
See application file for complete search history.

(56) References Cited

U.S. PATENT DOCUMENTS

| | | | | |
|---|---|---|---|---|
| RE44,486 E | * | 9/2013 | Mallwitz ............... | H02M 3/158 323/225 |
| 2010/0172166 A1 | * | 7/2010 | Singh ..................... | H02M 1/42 363/131 |
| 2011/0273017 A1 | * | 11/2011 | Borup ..................... | H02J 3/383 307/63 |
| 2012/0044599 A1 | * | 2/2012 | Veskovic ............... | H02H 9/005 361/18 |
| 2012/0275201 A1 | * | 11/2012 | Koyama ................ | H02M 1/126 363/40 |

(Continued)

FOREIGN PATENT DOCUMENTS

| | | |
|---|---|---|
| CN | 105119319 A | 12/2015 |
| EP | 2 114 083 A2 | 11/2009 |
| EP | 2114003 A1 | 11/2009 |

OTHER PUBLICATIONS

Franke, W.T., et al., "Analysis of Control Strategies for a 3 Phase 4 wire Topology for Transformerless Solar Inverters," IEEE International Symposium on Industrial Electronics, pp. 658-663 (2010).

(Continued)

*Primary Examiner* — Thienvu V Tran
*Assistant Examiner* — Brian K Baxter
(74) *Attorney, Agent, or Firm* — Wood IP LLC

(57) ABSTRACT

There are provided methods and systems for interfacing converters and solar power arrays. For example, there is provided a method for interfacing a solar power generation apparatus with an electricity grid. The method can include connecting a first level and a second level of the solar power generation apparatus to a two-level converter. Furthermore, the method can include interfacing the two-level converter with the electricity grid via a four-wire connection.

13 Claims, 5 Drawing Sheets

(56) References Cited

U.S. PATENT DOCUMENTS

| | | | |
|---|---|---|---|
| 2013/0016549 A1* | 1/2013 | Kieferndorf | H02M 1/14 363/131 |
| 2013/0070491 A1 | 3/2013 | Jiang-Hafner et al. | |
| 2014/0049117 A1* | 2/2014 | Rahman | H02J 4/00 307/82 |
| 2014/0264625 A1* | 9/2014 | Adamski | H01L 27/088 257/392 |
| 2014/0306544 A1* | 10/2014 | Hantschel | H02J 3/383 307/82 |
| 2014/0334202 A1* | 11/2014 | Cameron | H02J 5/00 363/56.01 |
| 2014/0376293 A1* | 12/2014 | West | H02M 1/126 363/131 |
| 2015/0155712 A1* | 6/2015 | Mondal | H02J 3/1857 307/23 |
| 2015/0372615 A1 | 12/2015 | Ayyanar | |
| 2016/0013637 A1* | 1/2016 | Olivares Perl | H02H 9/04 320/111 |
| 2016/0099569 A1* | 4/2016 | Rilling | G01R 31/3278 307/125 |
| 2016/0322825 A1* | 11/2016 | Urry | H02J 3/383 |
| 2019/0115140 A1* | 4/2019 | Morinaga | H01F 27/245 |
| 2019/0156990 A1* | 5/2019 | Igarashi | H01F 27/2823 |

OTHER PUBLICATIONS

Zhong, Q. C., et al., "H Control of the Neutral Point in Four-Wire Three-Phase DC-AC Converters," IEEE Transactions on Industrial Electronics, vol. 53, No. 5, pp. 1594-1602 (Oct. 2006).

International Search Report and Written Opinion issued in connection with corresponding PCT Application No. PCT/EP2017/055426 dated Jul. 24, 2017.

\* cited by examiner

SOLAR POWER CONVERTER WITH FOUR-WIRE GRID-SIDE CONNECTION

TECHNICAL FIELD

The present disclosure generally relates to solar power converters. More particularly, the present disclosure relates to a solar power converter with a four-wire grid-side connection.

BACKGROUND

A DC to AC converter, i.e. an inverter, is typically used when connecting a solar power plant to an electricity grid. Refinements in insulation systems and the evolution of practice in the art have led to bipolar (i.e. two-level) 1.5 kV solar cell arrays connected in such a way that a net 3 kV link is used to collect photo-generated current from the solar power plant. Such arrays output power that is likely in the megawatt regime. This increase in power throughput and voltage typically leads to increased costs.

Furthermore, where such arrays exist, uneven irradiance reduces to the annual energy yield. Therefore, the ability to separately determine the optimal voltage from a positive sub-array and from a negative sub-array is needed in order to recapture energy that would otherwise be lost when the solar array is restricted to a single voltage.

Lastly, typical solar power converters optimized for a 3-wire grid-side connection do not take into account the complexity of controlling a positive bus current independently of a negative bus current while providing independence in bus voltage. As such, there is a need to control an optimized forward sequence current in quadrature (D/Q) independence, especially when the converted currents are recombined in the high-voltage winding of a transformer and fed to the electricity grid.

SUMMARY

The embodiments featured herein help solve or mitigate the above-noted issues as well as other issues known in the art. Specifically, the embodiments allow lower voltage components (such as wiring insulation) to operate with higher voltage photovoltaic (i.e. solar) arrays, which means that costs are not increased as a result of increased voltage and power. Further, the embodiments allow the ability to separately determine the optimal voltage from a positive sub-array and from a negative sub-array, thereby allowing the recapturing of energy that would be otherwise lost if only a single voltage was used. Furthermore, the embodiments allow the control of the currents from the solar array independently, using a two-level converter, each level of the two levels being dedicated to a current originating from the solar array.

In one exemplary embodiment, there is provided a method for interfacing a solar power generation apparatus with an electricity grid. The method can include connecting a first level and a second level of the solar power generation apparatus to a two-level converter. Furthermore, the method can include interfacing the two-level converter with the electricity grid via a four-wire connection.

In another exemplary embodiment, there is provided a system for interfacing a solar power generator with an electricity grid. The system includes a two-level converter. Furthermore, the system can include an interface including: a four-wire connection between the two-level converter and the electricity grid, a first connection between the two-level converter and a first level of the solar power generator, and a second connection between the two-level converter and a second level of the solar power generator.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility. For example, in some embodiments, instead of comprising a solar array as the DC stage of the power conversion systems described below, a bank of high voltage storage capacitors can be used to feed energy to an electricity grid.

Figure 1:
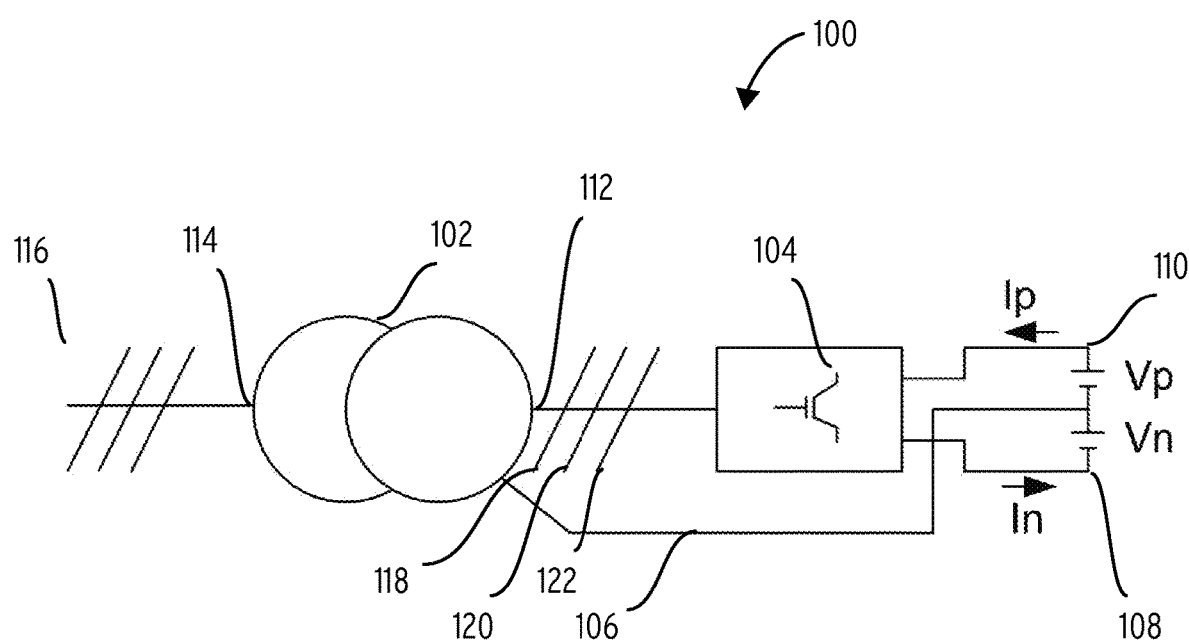
FIG. 1 is an illustration of a system according to an embodiment.

FIG. 1 is an illustration of a system 100 according to an embodiment. System 100 is a power conversion system, where DC voltages generated at a solar power plant (or a solar power generation apparatus, a solar power generator, or a photovoltaic (PV) array) are fed back to an electricity grid 116 after undergoing a DC to AC conversion. For example, as shown in FIG. 1, one of the DC voltages of the solar power plant can be at a first level 110 (denoted Vp), which can be a positive voltage. Similarly, another one of the DC voltages of the solar power plant can be at a second level 108 (denoted Vn), which can be a negative voltage. Each of these voltages can originate from a distinct sub-array comprised in an array of photovoltaic cells of the solar power plant.

First level 110 and second level 108 correspond to currents Ip and In, respectively, which are fed to a two-level converter 104. The two-level converter 104 can be a DC to AC converter, i.e. an inverter. In the present invention, any inverter topology can be used without departing from the scope of the teachings presented herein. For example, two-level converter 104 can be a half-wave bipolar array, i.e. it may include insulated-gated bipolar transistors (IGBTs). In some embodiments, the converter can have a bank of capacitors at its input stage. In other embodiments, there may be no capacitor bank at the input stage of the converter.

Two-level converter 104 is configured to output three AC voltages, Va (line 118), Vb (line 120), and Vc (line 122), each corresponding to a phase of a three-phase transmission system. These voltages, along with their corresponding currents Ia, Ib, and Ic, can be fed to a secondary terminal 112 of a transformer 102 disposed between the two-level converter 104 and electricity grid 116. Transformer 102 serves to step up these voltages and currents and to feed them to electric electricity grid 116 at a primary terminal 114.

System 100 can include a neutral line 106 which is fed to transformer 102 at a ground terminal (not shown). Neutral line 106 can carry a zero sequence current, which is a common mode current. For example, in system 100, a third harmonic current can cause an increase in the zero sequence current, which therefore results in an increase in current carried by neutral line 106.

On the grid side (i.e. at transformer 102), system 100 includes a 4-wire connection given by the three AC voltage lines at secondary terminal 112 and by neutral line 106 at the ground terminal. On the other hand, at the solar power plant side, system 100 includes a three-wire topology given by the two levels of the solar power plant and its neutral line 106, which can carry a voltage situated at the mid-point between first level 110 and second level 108. Taken together, the three-wire connection at the PV array side and the four-wire connection at the grid side can be thought of as an interface that links the various components of system 100.

System 100 (as well as the other embodiments of the invention that are described below) allows the precise control of the forward (positive) sequence current that creates power in the same phase sequence as the utility grid power. On the other hand, system 100 effectively minimizes negative sequence currents (or voltages) that generally result from imbalanced loads and/or grid faults. Stated otherwise, embodiments of the invention maximize the forward sequence current, which in turns maximizes the power delivered to the utility grid. With embodiments of the invention, a 16% improvement in throughput power can be achieved, when compared to the typical solar power converters that utilize a 3-wire grid-side connection.

Figure 2:
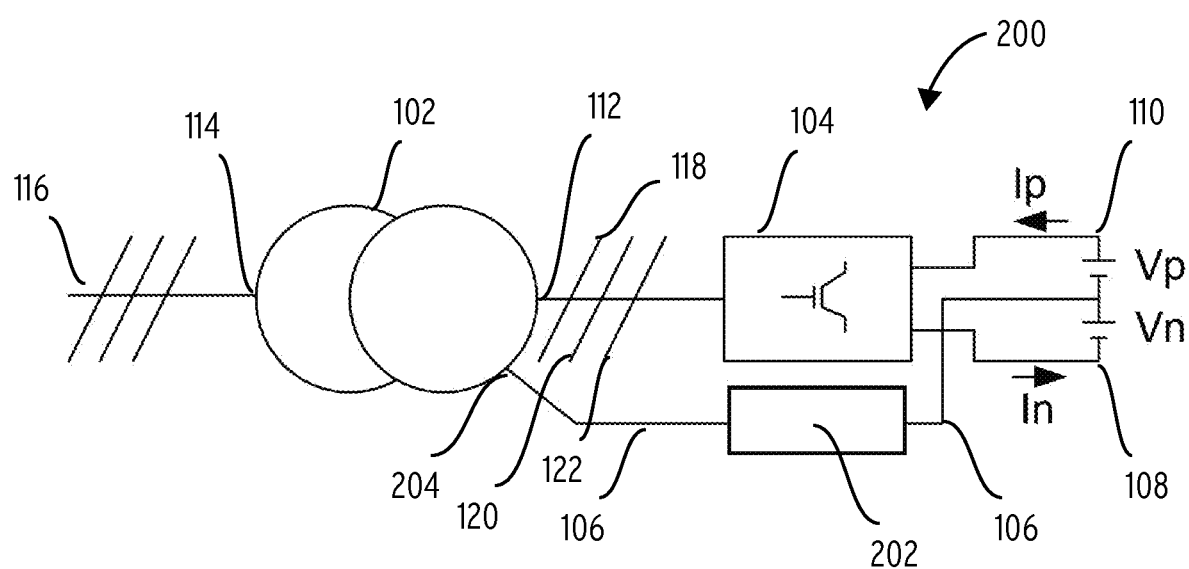
FIG. 2 is an illustration of a system according to another embodiment.

FIG. 2 shows a system 200 according to another embodiment. System 200 differs from system 100 simply by the addition of an impedance 202 on neutral line 106. Impedance 202 may be an inductive impedance, and it may be implemented with an inductor or with a plurality of passive and/or active components whose impedance is inductive once they are combined. Impedance 202 serves to minimize or prevent distortions in the AC signal that may arise from the DC to AC conversion process undertaken by two-level converter 104. In FIG. 2, impedance 202 is grounded at ground terminal 204 of transformer 102.

Figure 3:
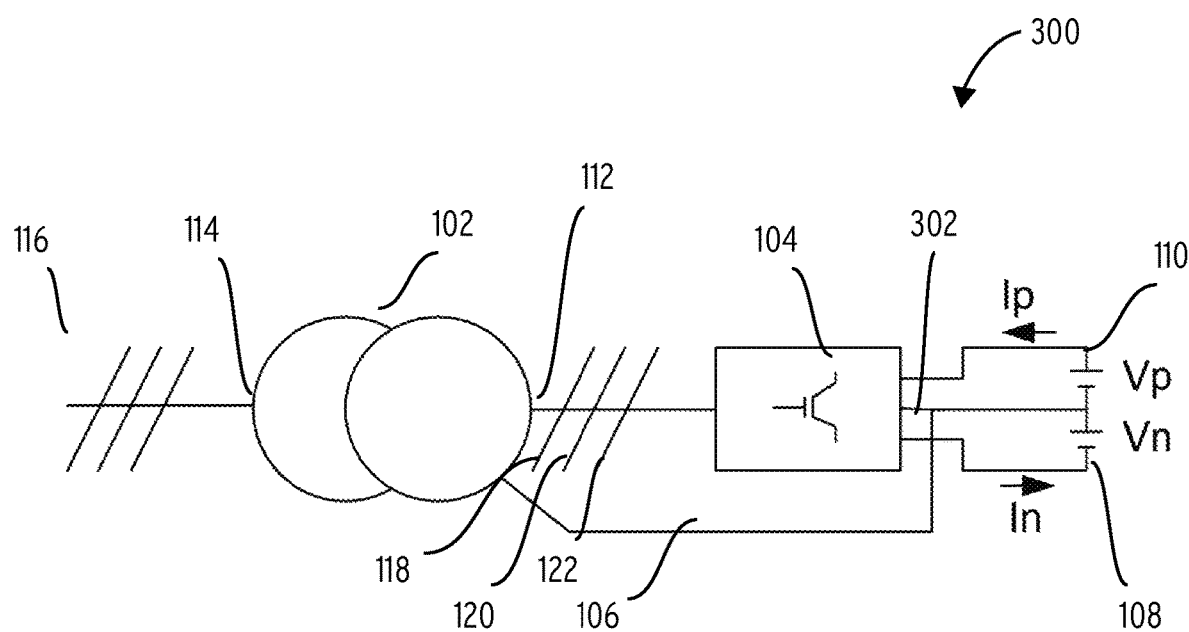
FIG. 3 is an illustration of a system according to yet another embodiment.

FIG. 3 shows a system 300 according to another embodiment. System 300 differs from system 100 simply by the addition of a connection 302 of neutral line 106 to an input stage of two-level converter 104. In this embodiment, the mid-point of the solar power plant (i.e. neutral line 106) is carried back to the inverter, i.e. to two-level converter 104. This allows the possibility of using an inverter topology with two split capacitor banks at the input stage, as shown in FIG. 4.

Figure 4:
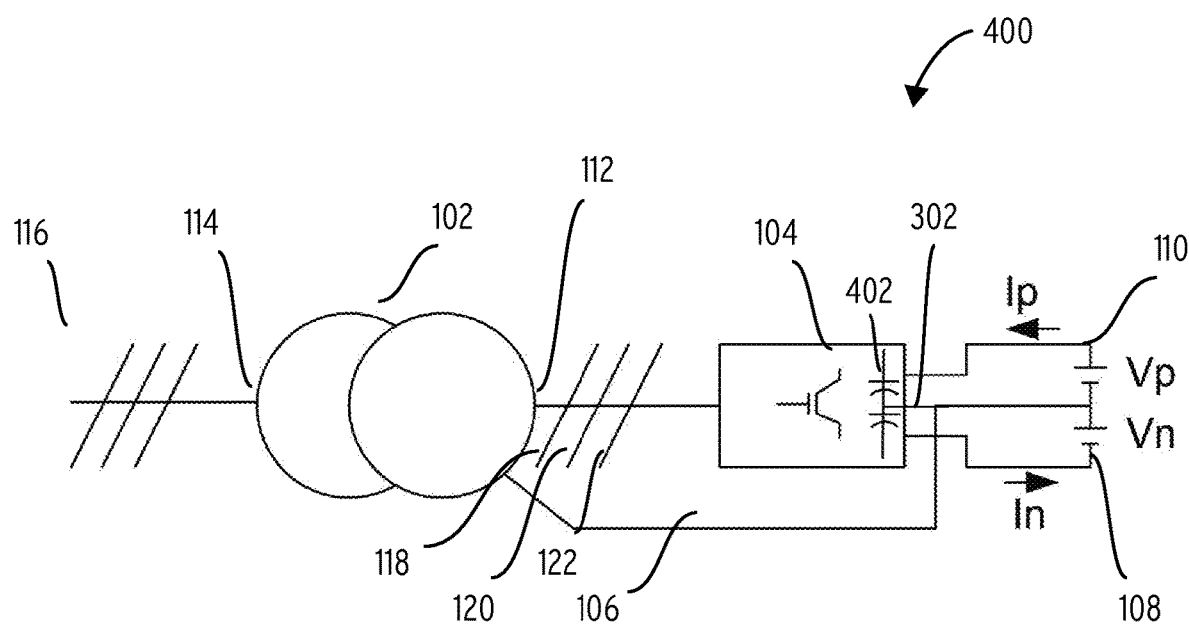
FIG. 4 is an illustration of a system according to yet another embodiment.

FIG. 4 shows a system 400, which is a variant implementation of system 300. In system 400, neutral line 106 is interfaced directly with a split capacitor bank 402 via connection 302. In system 400, just as in system 300, by bringing neutral line 106 back to converter 104, the inverter topology can be selected to allow independent control voltages and currents in the two different sides of the PV array with respect to neutral line 106. This is achieved with a current path that extends directly from the inverter to the mid-point of the PV array, contrary to the embodiments shown in FIGS. 1 and 2. As such, system 300 and system 400 each provides more flexibility for current flow, since they each include an additional current path. This architecture can reduce and/or minimize the current on neutral line 106.

Figure 5:
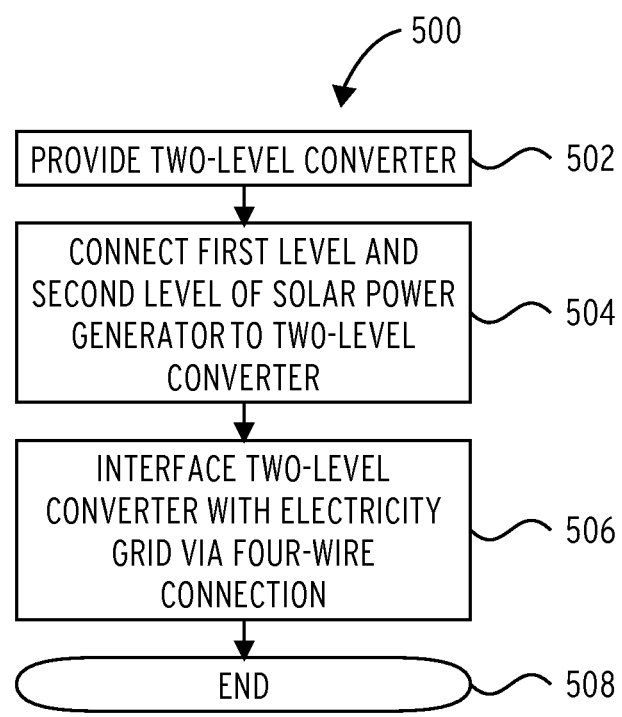
FIG. 5 depicts a flow chart of a method according to one embodiment.

Having set forth the structure of various embodiments of the invention, a method 500 consistent with their operation is now described with respect to FIG. 5. Method 500 begins at block 502, which consists of providing a two-level converter. The two-level converter can be a half-wave bipolar array. At block 504, method 500 can include connecting a first level and a second level of a solar power generator to the two-level converter. In block 506, method 500 can include interfacing the two-level converter with an electricity grid via a four-wire connection. Method 500 ends at block 508. In method 500, the first level of the solar power generator can be a positive DC voltage and the second level can be a negative DC voltage.

Further, at block 506, the four-wire configuration may include a neutral line of the solar power generation apparatus, and the interfacing can also include connecting the neutral line to a ground terminal of a transformer disposed between the two-level power converter and the electricity grid. Moreover, the interfacing can also include providing a connection between the neutral line and the two-level converter, for example, at a capacitor bank included in the two-level converter. The neutral line can include an inductor or an inductive impedance that prevents or minimizes distortion.

Furthermore, at block 506, the four-wire connection can include three wires, each corresponding to a phase voltage of an AC signal originating from the two-level converter, and one wire corresponding to the neutral line.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A method for interfacing a solar power generation apparatus with an electricity grid, the method comprising:
connecting a first level and a second level of the solar power generation apparatus to a two-level converter, the first level and the second level being a positive voltage and a negative voltage, respectively; and
interfacing to the electricity grid via a four-wire connection comprising a neutral line of the solar power generation apparatus and first, second, and third lines of the two-level converter having respective alternating current voltages, the neutral line directly connecting a mid-point between the positive voltage and the negative voltage of the solar power generation apparatus, to (i) a transformer disposed between the two-level converter and the electricity grid and (ii) an input voltage of the two-level converter.

2. The method of claim 1, wherein the two-level converter is a half-wave bipolar array.

3. The method of claim 1, wherein the interfacing includes connecting the neutral line to a ground terminal of the transformer disposed between the two-level converter and the electricity grid.

4. The method of claim 3, wherein the interfacing includes connecting the neutral line to the two-level converter.

5. The method of claim 1, wherein the neutral line includes an inductor.

6. The method of claim 1, wherein the interfacing includes connecting the neutral line to a capacitor bank included in the two-level converter.

7. The method of claim 6, wherein the interfacing includes connecting the neutral line to the solar power generation apparatus.

8. A system for interfacing with an electricity grid, the system comprising:
   a solar power generator having a first line with a positive voltage, a second line with a negative voltage, and a neutral line;
   a two-level converter having first, second, and third lines with respective alternating current voltages, wherein the first line and second line of the solar power generator are connected to the two-level converter; and
   an interface comprising a four-wire connection to the electricity grid, the four-wire connection comprising the first, second, and third lines of the two-level converter and the neutral line of the solar power generator;
   wherein the neutral line directly connects a mid-point between the positive voltage and the negative voltage of the solar power generator to (i) a transformer disposed between the two-level converter and the electricity grid and (ii) an input voltage of the two-level converter.

9. The system of claim 8, wherein the two-level converter is a half-wave bipolar array.

10. The system of claim 8, wherein the neutral line is connected to a ground terminal of the transformer disposed between the two-level converter and the electricity grid.

11. The system of claim 8, wherein the neutral line includes an inductor.

12. The system of claim 8, wherein the neutral line is connected to a capacitor bank included in the two-level converter.

13. The system of claim 8, wherein a voltage on the neutral line is at a mid-point between the positive voltage and the negative voltage.

\* \* \* \* \*